United States Patent
Wiesenburger

(10) Patent No.: US 10,638,658 B2
(45) Date of Patent: *May 5, 2020

(54) FERTILIZER TUBE SYSTEM

(71) Applicant: Totally Tubular Mfg., Inc., Aberdeen, SD (US)

(72) Inventor: Brent W. Wiesenburger, Aberdeen, SD (US)

(73) Assignee: Totally Tubular Mfg., Inc., Aberdeen, SD (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/997,218

(22) Filed: Jun. 4, 2018

(65) Prior Publication Data

US 2018/0279546 A1    Oct. 4, 2018

Related U.S. Application Data

(63) Continuation of application No. 15/583,042, filed on May 1, 2017, now Pat. No. 9,986,681, which is a
(Continued)

(51) Int. Cl.
*A01C 23/00* (2006.01)
*A01C 23/02* (2006.01)
(Continued)

(52) U.S. Cl.
CPC .............. *A01C 23/006* (2013.01); *A01C 7/06* (2013.01); *A01C 15/00* (2013.01); *A01C 23/025* (2013.01); *A01C 5/064* (2013.01)

(58) Field of Classification Search
CPC ......... A01C 23/006; A01C 23/00; A01C 7/06; A01C 7/00; A01C 15/00; A01C 23/025;
(Continued)

(56) References Cited

U.S. PATENT DOCUMENTS

| 791,465 A | 6/1905 | Henderson |
|---|---|---|
| 1,302,428 A | 4/1919 | Pereda |

(Continued)

OTHER PUBLICATIONS

P. 1 & p. 16 of Kinze Model 4900 Front Folding Planter Parts Manual; Manual at www.kinze.com/filesimages/manuals/4900_M0247-02_R0115.pdf; Received & Printed Mar. 19, 2015.
(Continued)

*Primary Examiner* — Christopher J. Novosad
(74) *Attorney, Agent, or Firm* — Neustal Law Offices

(57) ABSTRACT

A fertilizer tube system for efficiently dispensing and placing fertilizer within a furrow to minimize germination injury. The fertilizer tube system generally includes a fertilizer tube having an input opening at an upper end of the fertilizer tube and an output opening at a lower end of the fertilizer tube, a tab attached to the fertilizer tube between the input opening and the output opening and a guard scraper attached to a lower portion of the fertilizer tube. The guard scraper includes a mounting portion having a receiver channel adapted to be removably attachable to a mounting member of a planter shank of a planter implement, wherein the mounting member is comprised of an inverted T-shaped structure.

23 Claims, 14 Drawing Sheets

Related U.S. Application Data continuation of application No. 14/699,868, filed on Apr. 29, 2015, now Pat. No. 9,635,805, which is a continuation-in-part of application No. 14/682,486, filed on Apr. 9, 2015, now Pat. No. 9,642,300.

(51) Int. Cl.
*A01C 7/06* (2006.01)
*A01C 15/00* (2006.01)
*A01C 5/06* (2006.01)

(58) Field of Classification Search
CPC ....... A01C 23/023; A01C 23/02; A01C 5/064; A01C 5/062; A01C 5/06; A01C 5/00
See application file for complete search history.

(56) References Cited

U.S. PATENT DOCUMENTS

| | | |
|---|---|---|
| 2,874,878 A | 2/1959 | Stokland |
| 2,912,944 A | 11/1959 | Snow |
| 3,207,389 A | 9/1965 | Beebe |
| 3,319,589 A | 5/1967 | Moran |
| 3,632,043 A | 1/1972 | Kirschmann |
| 3,653,550 A | 4/1972 | Williams |
| 4,224,882 A | 9/1980 | Cruse |
| 4,628,840 A | 12/1986 | Jacobson |
| 4,656,957 A | 4/1987 | Williamson |
| 4,947,770 A | 8/1990 | Johnston |
| 4,998,488 A | 3/1991 | Hansson |
| 5,027,724 A | 7/1991 | Ptacek |
| 5,269,237 A | 12/1993 | Baker |
| 5,370,068 A | 12/1994 | Rawson |
| 5,461,994 A | 10/1995 | Zimmerman |
| 5,477,792 A | 12/1995 | Bassett |
| 5,622,124 A | 4/1997 | Smith |
| 5,862,763 A | 1/1999 | Dietrich, Sr. |
| 6,006,684 A | 12/1999 | Whalen |
| 6,095,065 A | 8/2000 | Dietrich, Sr. |
| 6,289,829 B1 | 9/2001 | Fish |
| 6,363,870 B1 | 4/2002 | King |
| 7,096,805 B1 | 8/2006 | Wiesenburger |
| 7,128,007 B1 | 10/2006 | Wiesenburger |
| 9,635,805 B2 | 5/2017 | Wiesenburger |
| 9,642,300 B2 | 5/2017 | Wiesenburger |
| 9,642,301 B2 | 5/2017 | Wiesenburger |
| 9,986,681 B2 * | 6/2018 | Wiesenburger ...... A01C 23/025 |
| 9,992,928 B2 * | 6/2018 | Wiesenburger ......... A01C 7/06 |
| 2009/0308296 A1 | 12/2009 | Senchuk |

OTHER PUBLICATIONS www.deere.com/en_US/products/equipment/planting_and_seeding_equipment/planters/row_units/max_emerge_5_row_unit . . . ; MaxEmerge 5 by John Deere; Received and Printed Apr. 27, 2015.
Pictures of Prior Art Planter Seed Tube Guard; Jan. 1, 2014.

* cited by examiner

FERTILIZER TUBE SYSTEM

CROSS REFERENCE TO RELATED APPLICATIONS

The present application is a continuation of U.S. application Ser. No. 15/583,042 filed on May 1, 2017 which issues on Jun. 5, 2018 as U.S. Pat. No. 9,986,681, which is a continuation of U.S. application Ser. No. 14/699,868 filed on Apr. 29, 2015 now issued as U.S. Pat. No. 9,635,805, which is a continuation-in-part of U.S. application Ser. No. 14/682,486 filed on Apr. 9, 2015 now issued as U.S. Pat. No. 9,642,300. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND OF THE INVENTION

Field of the Invention

The present invention relates generally to a fertilizer applicator and more specifically it relates to a fertilizer tube system for efficiently dispensing and placing fertilizer within a furrow to minimize germination injury.

Description of the Related Art

Any discussion of the related art throughout the specification should in no way be considered as an admission that such related art is widely known or forms part of common general knowledge in the field.

Liquid fertilizer applicators have been in use for years. Typically, the placement of liquid fertilizer in close proximity to seeds during the planting process is done to improve crop yields. Unfortunately, current liquid fertilizer applicators utilized in the farming industry sometimes directly apply liquid fertilizer to the seed which results in burning of the seed thereby increasing germination injury.

While these devices may be suitable for the particular purpose to which they address, they are not as suitable for efficiently dispensing and placing liquid fertilizer within a furrow to minimize germination injury. Conventional fertilizer applicators tend to directly apply the fertilizer upon the seed thereby increasing germination injury.

BRIEF SUMMARY OF THE INVENTION

The invention generally relates to a fertilizer applicator which includes a fertilizer tube having an input opening at an upper end of the fertilizer tube and an output opening at a lower end of the fertilizer tube, a tab attached to the fertilizer tube between the input opening and the output opening and a guard scraper attached to a lower portion of the fertilizer tube. The guard scraper includes a mounting portion having a receiver channel adapted to be removably attachable to a mounting member of a planter shank of a planter implement, wherein the mounting member is comprised of an inverted T-shaped structure.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
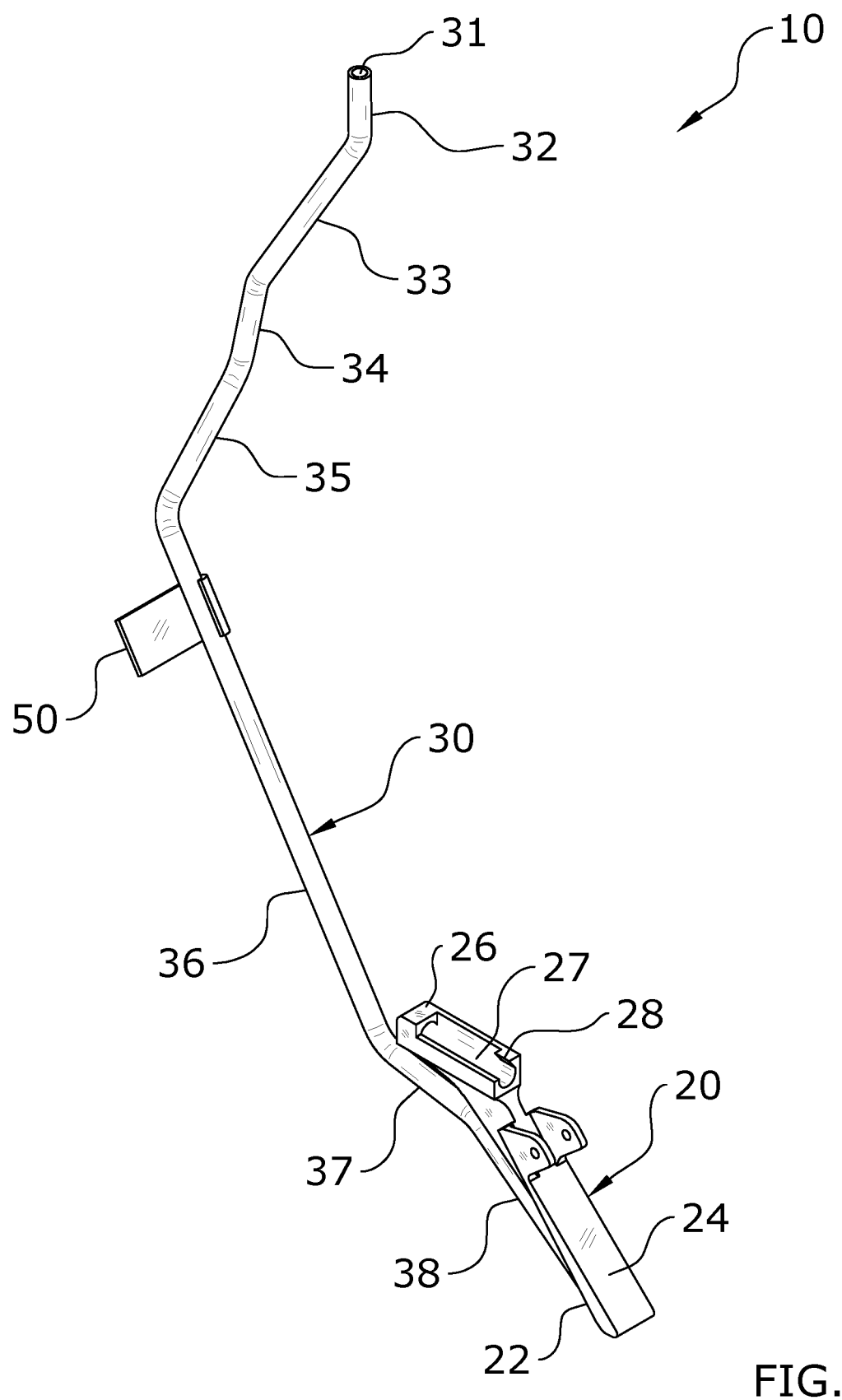
FIG. 1 is a rear left side perspective view of the present invention.

A. Overview.

Turning now descriptively to the drawings, in which similar reference characters denote similar elements throughout the several views, FIGS. 1 through 15 illustrate a fertilizer tube system 10, which comprises a fertilizer tube 30 having an input opening 31 at an upper end of the fertilizer tube 30 and an output opening 39 at a lower end of the fertilizer tube 30, a tab 50 attached to the fertilizer tube 30 between the input opening 31 and the output opening 39 and a guard scraper 20 attached to a lower portion of the fertilizer tube 30. The guard scraper 20 includes a mounting portion 26 having a receiver channel 27 adapted to be removably attachable to a mounting member 16 of a planter shank 14 of a planter implement, wherein the mounting member 16 is comprised of an inverted T-shaped structure.

The present invention is designed to be utilized in combination with a liquid fertilizer system used on a crop planter implement but may be utilized to dispense additional types of fertilizer such as non-liquid fertilizer. U.S. Pat. No. 7,096,805 (Liquid Fertilizer Application System) and U.S. Pat. No. 7,128,007 (Liquid Fertilizer Application System) both to Wiesenburger are hereby incorporated by reference herein in their entireties.

The present invention may be utilized with any type of planter implement designed for planting a row crop such as, but not limited to, the John Deere MaxEmerge 5 Row Unit manufactured by Deere & Company in Moline, Ill. The present invention may be utilized with respect to various other types of planter implements.

B. Fertilizer Tube.

Figure 2:
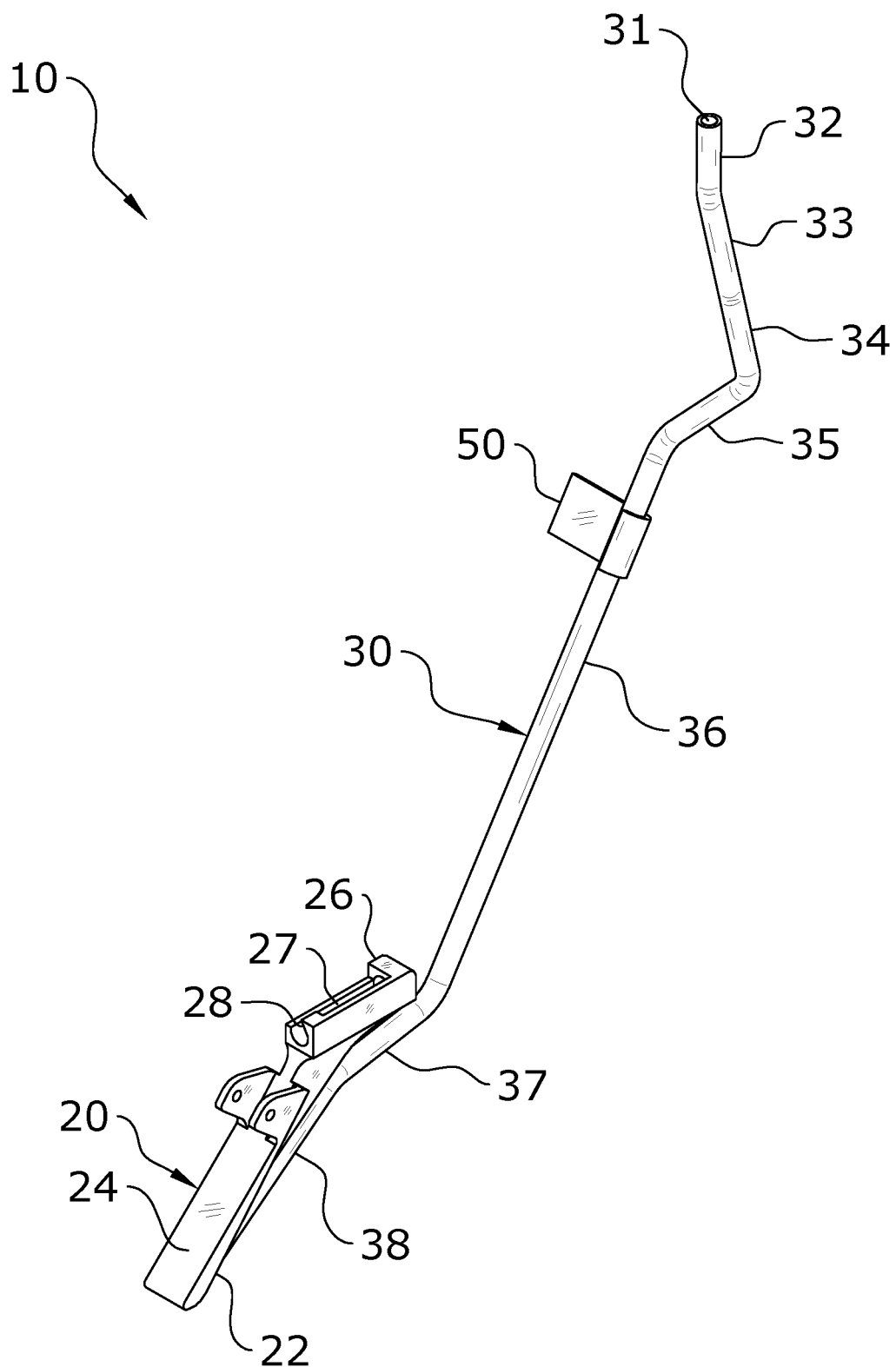
FIG. 2 is a rear right side perspective view of the present invention.
Figure 14:
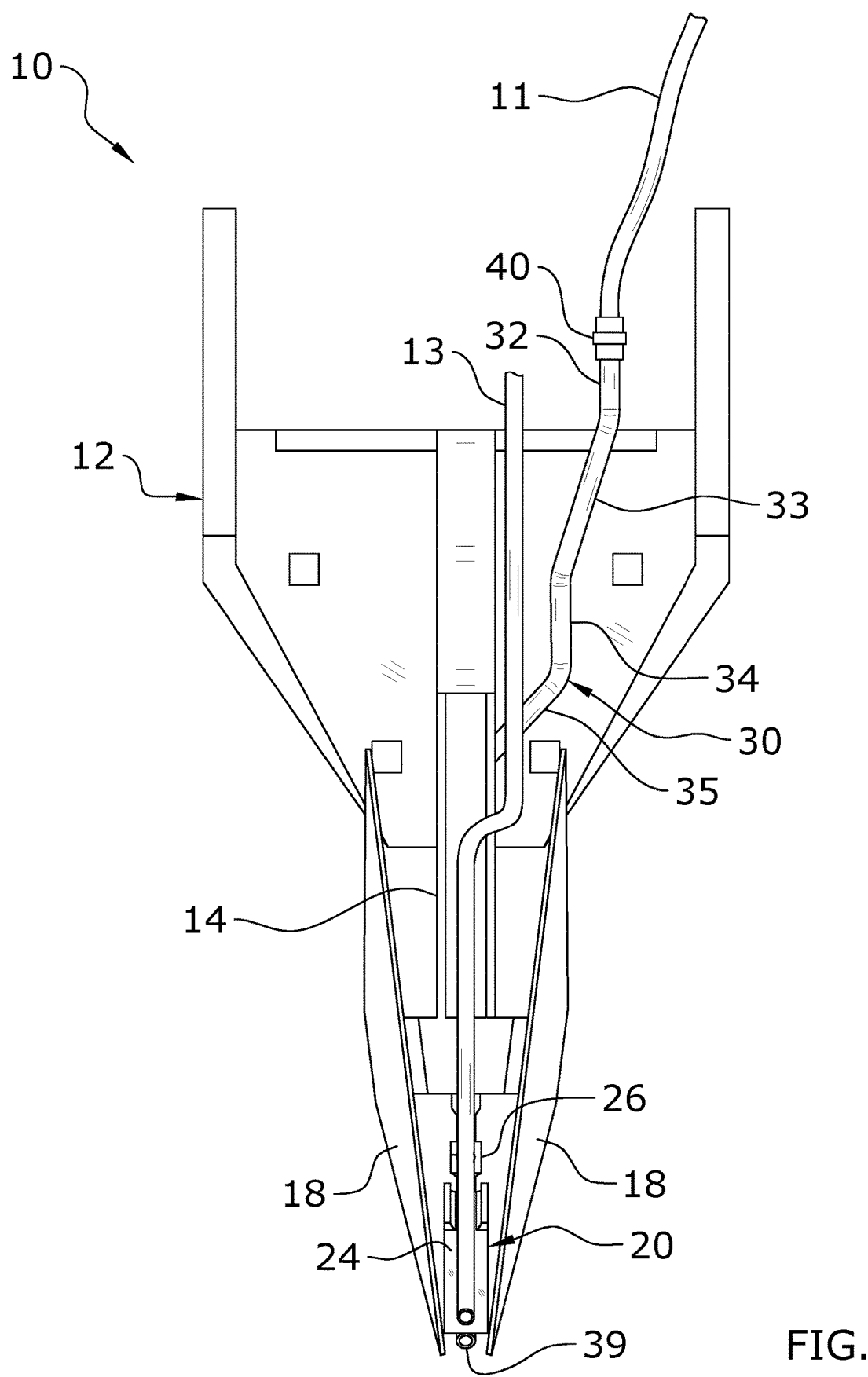
FIG. 14 is a rear view of the present invention attached to the planter shank with the seed tube attached.
Figure 15:
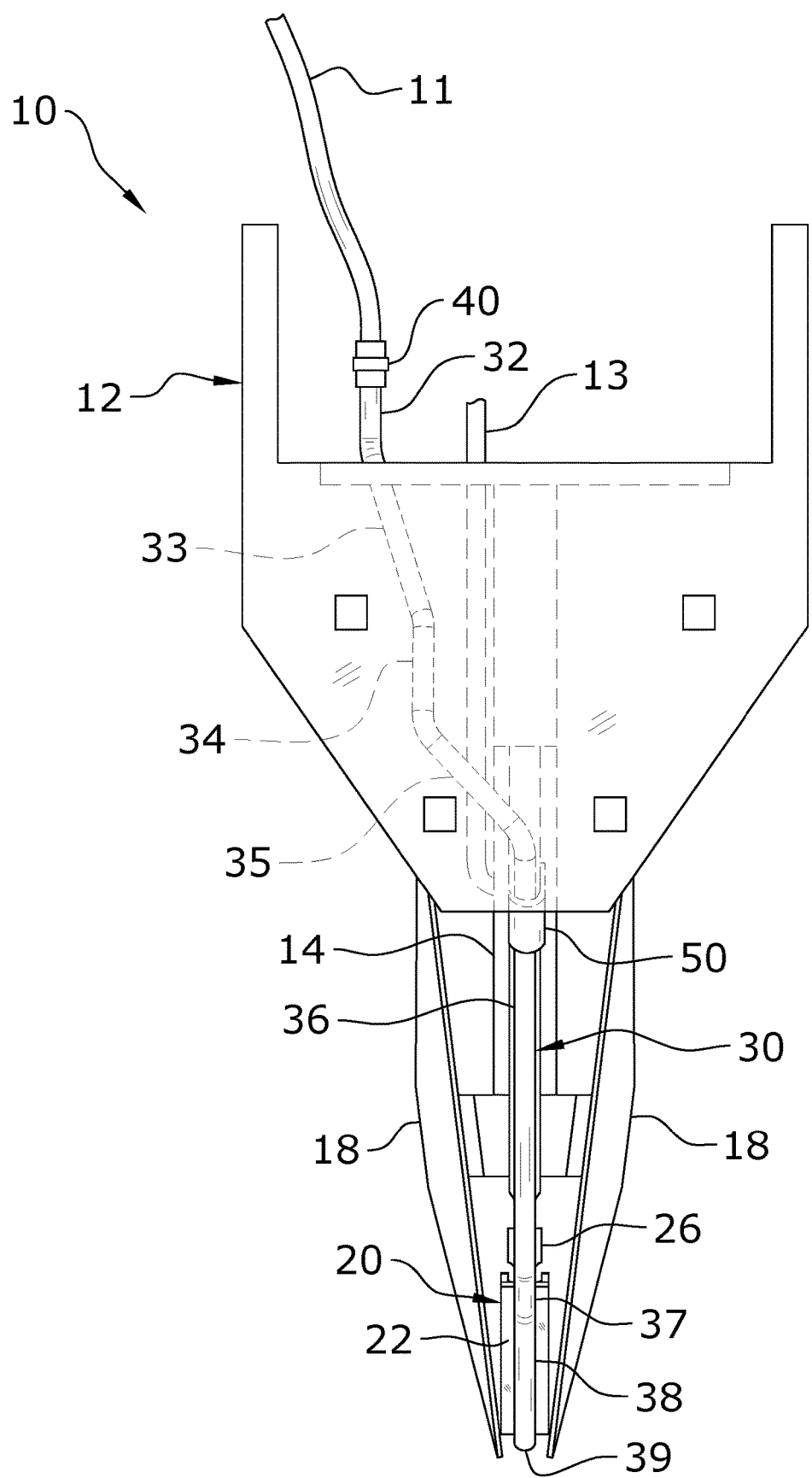
FIG. 15 is a front view of the present invention attached to the planter shank.

The fertilizer tube 30 is comprised of an elongated structure. The fertilizer tube 30 is not a straight structure as best illustrated in FIGS. 1 through 8 of the drawings. The fertilizer tube 30 has an input opening 31 at the upper end of the fertilizer tube 30 and an output opening 39 at the lower end of the fertilizer tube 30 as illustrated in FIGS. 1 and 2 of the drawings. The input opening 31 receives liquid fertilizer from a liquid fertilizer system and the output opening 39 dispenses the liquid fertilizer into a seed furrow or near a seed furrow created by the disks 18 of the planter implement. The lower portion of the fertilizer tube 30 is positioned between a pair of disks 18 of the planter implement when the fertilizer tube 30 is attached to the planter shank 14 as illustrated in FIGS. 14 and 15 of the drawings.

A coupler 40 fluidly connects the upper end of the fertilizer tube 30 to a fertilizer delivery tube 11 from the liquid fertilizer system of the planter implement. The coupler 40 is preferably comprised of a quick coupler 40 to allow for simple and easy connection of the fertilizer delivery tube 11 to the fertilizer tube 30.

The fertilizer tube 30 preferably has a circular cross sectional area but may have different cross sectional shapes (e.g. rectangular, oval). The lumen of the fertilizer tube 30 may be consistently in width or differing in width along the length of the fertilizer tube 30. The fertilizer tube 30 is preferably comprised of a continuous single tubular structure as illustrated in FIGS. 1 through 4 of the drawings. In particular, the fertilizer tube 30 is preferably constructed of a single piece of metal tubing that is bent to form the fertilizer tube 30. The fertilizer tube 30 is preferably comprised of a rigid material such as, but not limited to, metal.

As shown in FIGS. 1 through 9 of the drawings, the fertilizer tube 30 is comprised of a first segment 38 on the lower portion of the fertilizer tube 30, a second segment 37 extending from the first segment 38, a third segment 36 extending from the second segment 37, a fourth segment 35 extending from the third segment 36, a fifth segment 34 extending from the fourth segment 35, a sixth segment 33 extending from the fifth segment 34, and a seventh segment 32 extending from the sixth segment 33. Each segment is defined by a bend or corner in the fertilizer tube 30 redirecting the fertilizer tube 30. Each segment is preferably comprised of a substantially straight structure having an independent longitudinal axis that doesn't align with any of the other segments' axis.

Figure 3:
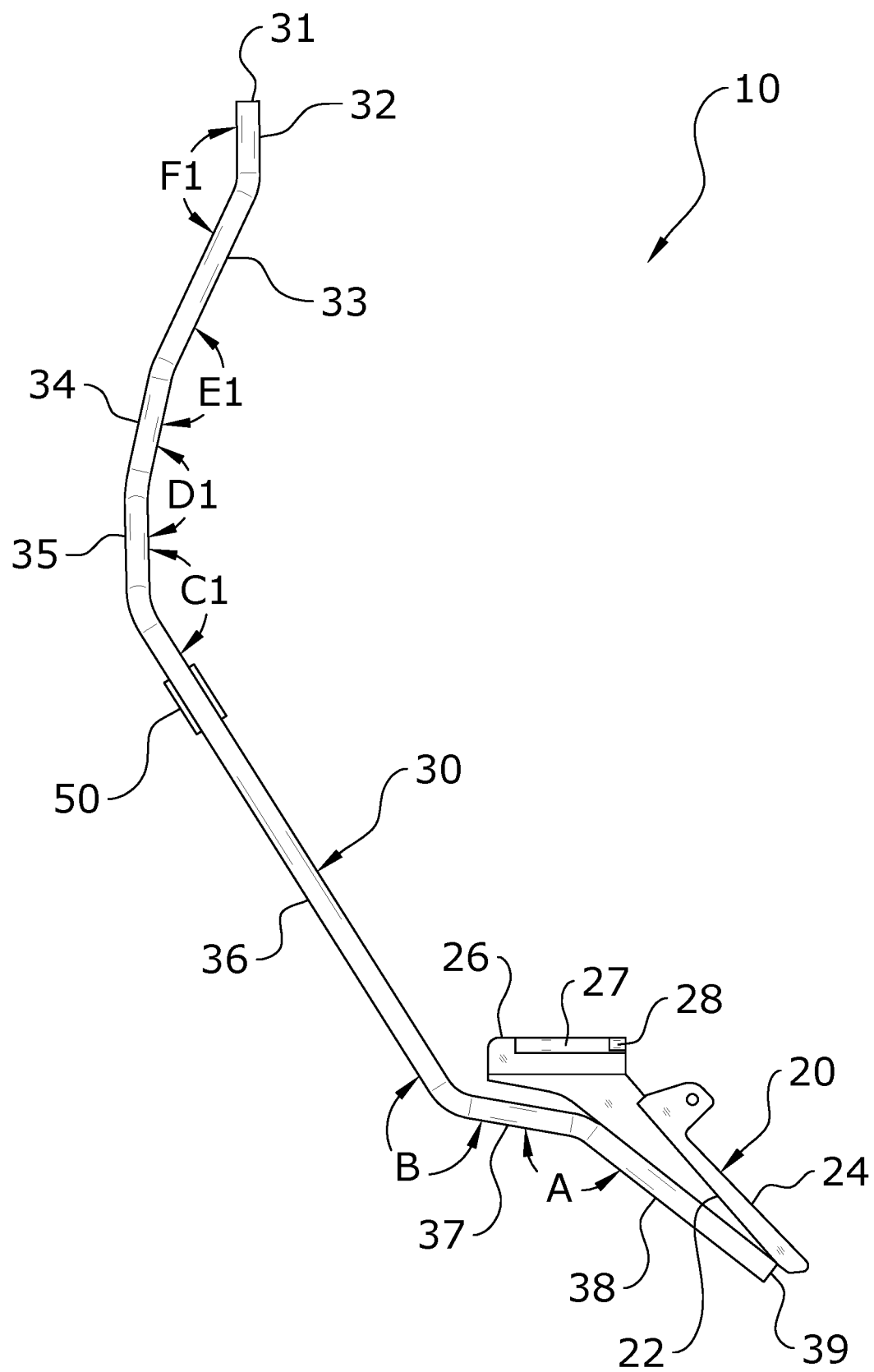
FIG. 3 is a left side view of the present invention.
Figure 4:
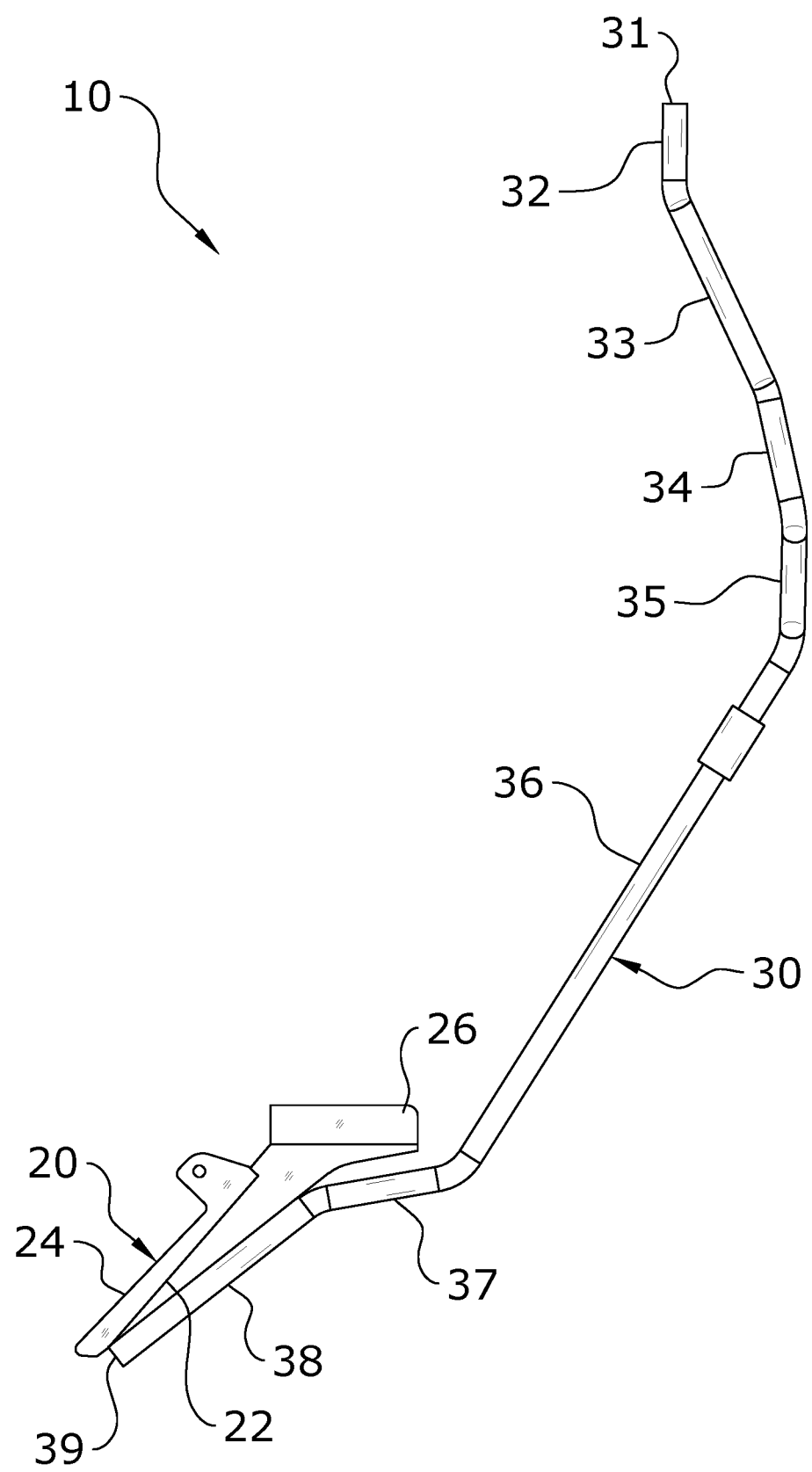
FIG. 4 is a right side view of the present invention.
Figure 5:
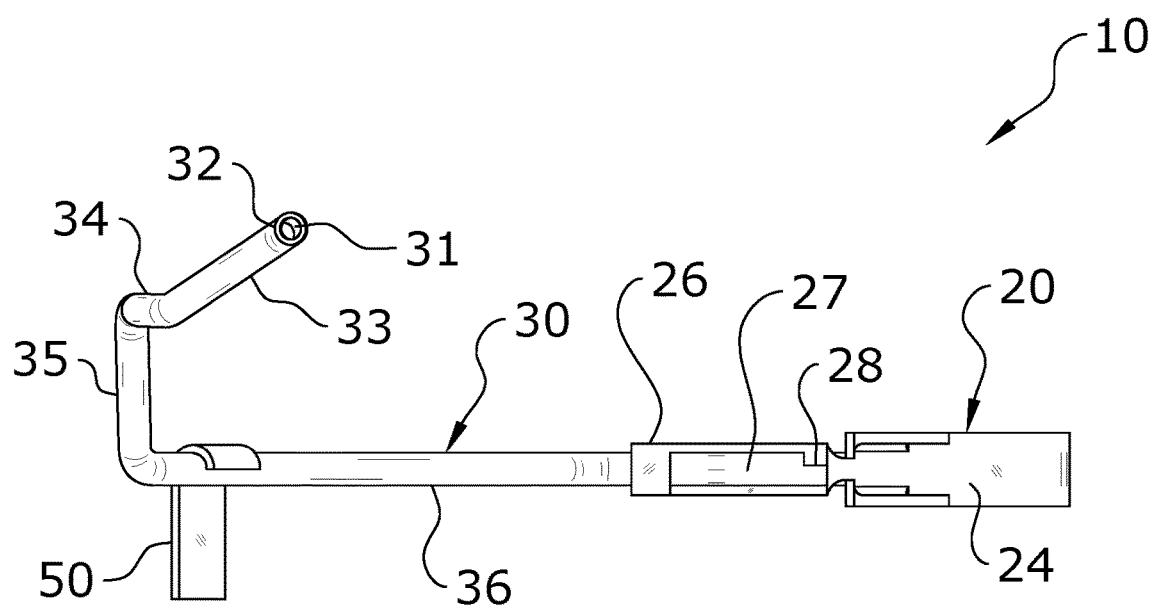
FIG. 5 is a top view of the present invention.
Figure 7:
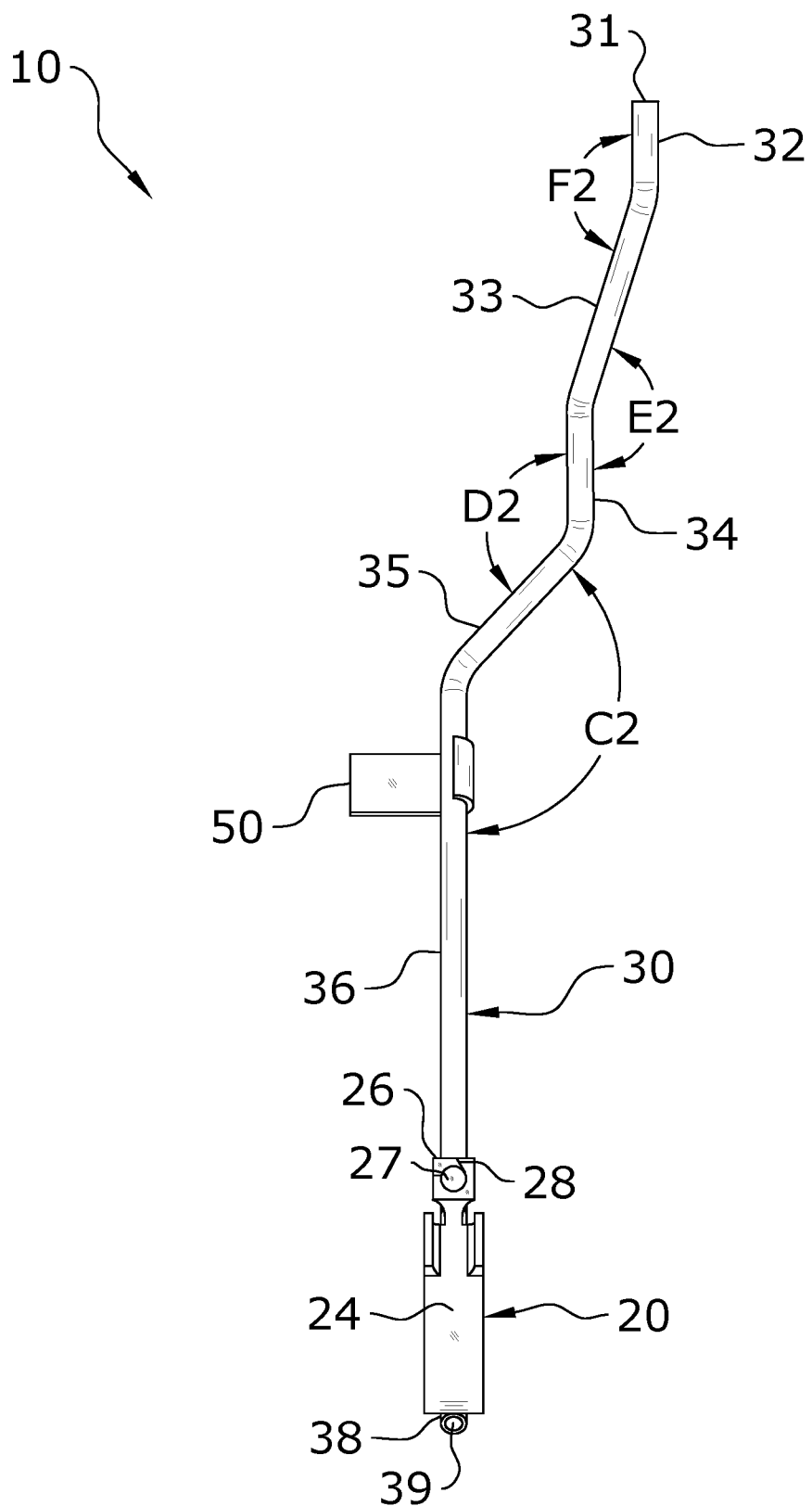
FIG. 7 is a rear view of the present invention.
Figure 8:
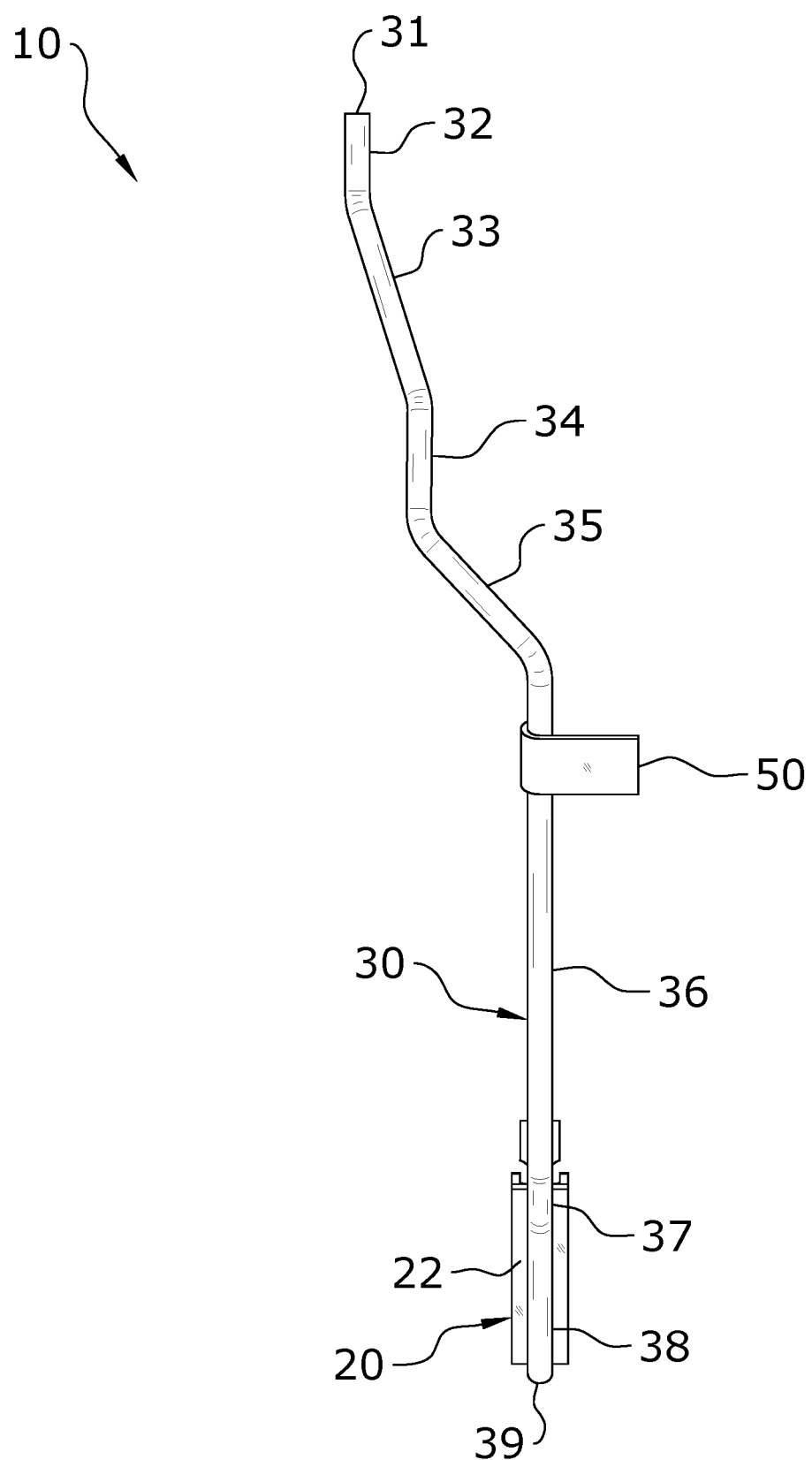
FIG. 8 is a front view of the present invention.

The first segment 38 of the fertilizer tube 30 is attached to a front edge 22 of the guard scraper 20 as best illustrated in FIGS. 3 and 4 of the drawings. The output opening 39 is within a lower distal end of the first segment 38 as illustrated in FIGS. 3 and 4. The lower end and the output opening 39 within the lower end of the first segment 38 are positioned near the lower end of the guard scraper 20 as illustrated in FIGS. 1 through 4 of the drawings. The first segment 38 is further preferably parallel to and adjacent to the front edge 22 of the guard scraper 20 as further illustrated in FIGS. 3 and 4 of the drawings. The first segment 38 may be attached to the guard scraper 20 by welding or other attachment means. When in use, the fertilizer tube 30 will be positioned in front of the guard scraper 20 with the front edge 22 angled downwardly and rearwardly as best illustrated in FIGS. 3 and 4. A portion of the first segment 38 of the fertilizer tube 30 will wear from engaging the earth over time. The exterior width of the first segment 38 is preferably approximately the same width as the main body portion of the guard scraper 20 as illustrated in FIGS. 7 and 8 of the drawings.

Figure 6:
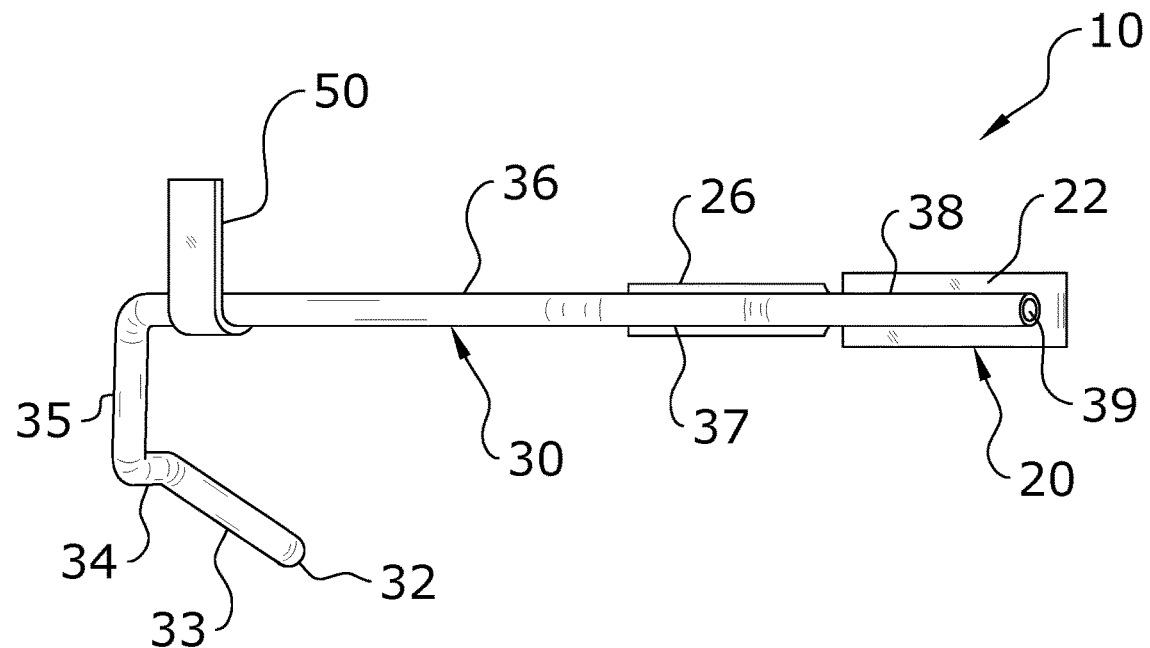
FIG. 6 is a bottom view of the present invention.

The first segment 38 has a first angle with respect to a horizontal plane (e.g. a ground surface) when the fertilizer tube system 10 is attached to the planter shank 14 as best illustrated in FIGS. 3 and 4 of the drawings. The second segment 37 extends forwardly from the end of the first segment 38 at a second angle with respect to the horizontal plane (e.g. a ground surface) when the fertilizer tube system 10 is attached to the planter shank 14 as further shown in FIGS. 3 and 4 of the drawings. While the first segment 38 and the second segment 37 both extend upwardly, the first angle for the first segment 38 is greater than the second angle for the second segment 37 as illustrated in FIGS. 3 and 4 of the drawings. The angle A between the first segment 38 and the second segment 37 as measured from the side is approximately 152 degrees but may vary greater or less. It is preferable that the second segment 37 is parallel to a vertical plane comprised of a plane that is parallel to the forward path of movement of the planter implement and the corresponding planter shank 14 that is vertically aligned. It is further preferable that both the first segment 38 and the second segment 37 are parallel with respect to the vertical plane as illustrated in FIGS. 6 and 8 of the drawings. The second segment 37 is preferably comprised of a straight segment extending from a first corner between the second segment 37 and the first segment 38 as illustrated in FIGS. 3 and 4 of the drawings. The second segment 37 has a longitudinal axis that is less vertically orientated than the first segment 38 when the fertilizer tube 30 is attached to the planter shank 14 as illustrated in FIGS. 3 and 4 of the drawings.

The third segment 36 extends upwardly and forwardly from the end of the second segment 37 opposite of the first segment 38 at a third angle with respect to the horizontal plane (e.g. a ground surface) when the fertilizer tube system 10 is attached to the planter shank 14 as further shown in FIGS. 3 and 4 of the drawings. While the first segment 38, the second segment 37 and the third segment 36 all extend upwardly, the third angle for the third segment 36 is greater than the first angle for the first segment 38 and the second angle for the second segment 37 as illustrated in FIGS. 3 and 4 of the drawings. The angle B between the second segment 37 and the third segment 36 as measured from the side is approximately 228 degrees but may vary greater or less. It is preferable that the third segment 36 is parallel to a vertical plane comprised of a plane that is parallel to the forward path of movement of the planter implement and the corresponding planter shank 14 that is vertically aligned. It is further preferable that the first segment 38, the second segment 37 and the third segment 36 are all preferably parallel with respect to the vertical plane as illustrated in FIGS. 6 and 8 of the drawings. The third segment 36 is preferably comprised of a straight segment extending from a second corner between the third segment 36 and the second segment 37 as illustrated in FIGS. 3 and 4 of the drawings. The third segment 36 has a longitudinal axis that is more vertically orientated than the first segment 38 and the second segment 37 when the fertilizer tube 30 is attached to the planter shank 14 as illustrated in FIGS. 3 and 4 of the drawings.

The fourth segment 35 extends upwardly from the end of the third segment 36 opposite of the second segment 37 at a fourth angle with respect to the horizontal plane measured from the side (e.g. a ground surface) when the fertilizer tube system 10 is attached to the planter shank 14 as further shown in FIGS. 3 and 4 of the drawings. While the first segment 38, second segment 37, the third segment 36 and the fourth segment 35 all extend upwardly, the fourth angle for the fourth segment 35 is preferably greater than the first angle for the first segment 38, the second angle for the second segment 37 and the third angle for the third segment 36 as illustrated in FIGS. 3 and 4 of the drawings. It is further preferable that the fourth angle for the fourth segment 35 is approximately 90 degrees. The angle C1 between the third segment 36 and the fourth segment 35 as measured from the side is approximately 149 degrees but may vary greater or less. The angle C2 between the third segment 36 and the fourth segment 35 as measured from the rear is approximately 137 degrees but may vary greater or less. It is preferable that the fourth segment 35 is not parallel to a vertical plane comprised of a plane that is parallel to the forward path of movement of the planter implement and the corresponding planter shank 14 that is vertically aligned. It is further preferable that the fourth segment 35 extends laterally to the right of the third segment 36 at an upward angle as best illustrated in FIG. 7 of the drawings. The fourth segment 35 is preferably comprised of a straight segment extending from a third corner between the fourth segment 35 and the third segment 36 as illustrated in FIGS. 3 and 4 of the drawings.

The fifth segment 34 extends upwardly and rearwardly from the end of the fourth segment 35 opposite of the third segment 36 at a fifth angle with respect to the horizontal plane measured from the side (e.g. a ground surface) when the fertilizer tube system 10 is attached to the planter shank 14 as further shown in FIGS. 3 and 4 of the drawings. The angle D1 between the fourth segment 35 and the fifth segment 34 as measured from the side is approximately 166 degrees but may vary greater or less. The angle D2 between the fourth segment 35 and the fifth segment 34 as measured from the rear is approximately 136 degrees but may vary greater or less. It is preferable that the fifth segment 34 is parallel to a vertical plane comprised of a plane that is parallel to the forward path of movement of the planter implement and the corresponding planter shank 14 that is vertically aligned. The fifth segment 34 is preferably comprised of a straight segment extending from a fourth corner between the fifth segment 34 and the fourth segment 35 as illustrated in FIGS. 3 and 4 of the drawings.

The sixth segment 33 extends upwardly and rearwardly from the end of the fifth segment 34 opposite of the fourth segment 35 at a sixth angle with respect to the horizontal plane measured from the side (e.g. a ground surface) when the fertilizer tube system 10 is attached to the planter shank 14 as further shown in FIGS. 3 and 4 of the drawings. The angle E1 between the fifth segment 34 and the sixth segment 33 as measured from the side is approximately 167 degrees but may vary greater or less. The angle E2 between the fifth segment 34 and the sixth segment 33 as measured from the rear is approximately 162 degrees but may vary greater or less. It is preferable that the sixth segment 33 is not parallel to a vertical plane comprised of a plane that is parallel to the forward path of movement of the planter implement and the corresponding planter shank 14 that is vertically aligned. The sixth segment 33 is preferably comprised of a straight segment extending from a fifth corner between the sixth segment 33 and the fifth segment 34 as illustrated in FIGS. 3 and 4 of the drawings.

The seventh segment 32 extends upwardly from the end of the sixth segment 33 opposite of the fifth segment 34 at a seventh angle with respect to the horizontal plane measured from the side (e.g. a ground surface) when the fertilizer tube system 10 is attached to the planter shank 14 as further shown in FIGS. 3 and 4 of the drawings. The angle F1 between the sixth segment 33 and the seventh segment 32 as measured from the side is approximately 154 degrees but may vary greater or less. The angle F2 between the sixth segment 33 and the seventh segment 32 as measured from the rear is approximately 163 degrees but may vary greater or less. It is preferable that the seventh segment 32 is parallel to a vertical plane comprised of a plane that is parallel to the forward path of movement of the planter implement and the corresponding planter shank 14 that is vertically aligned. It is further preferable that the seventh segment 32 is substantially vertically aligned having a longitudinal axis that is approximately vertical (i.e. approximately 90 degrees with respect to a horizontal ground surface from all angles. The seventh segment 32 is preferably comprised of a straight segment extending from a sixth corner between the seventh segment 32 and the sixth segment 33 as illustrated in FIGS. 3 and 4 of the drawings. The coupler 40 is attached to the seventh segment 32 for removably connecting the fertilizer tube 30 to a fertilizer delivery tube 11.

The third segment 36 is substantially longer than either the first segment 38 or the second segment 37. The third segment 36 is preferably longer than the first segment 38 and the second segment 37 added together. The second segment 37 is preferably shorter in length than the first segment 38. The third segment 36 is preferably longer than the fourth segment 35, the fifth segment 34, the sixth segment 33 and the seventh segment 32. The first segment 38 is preferably approximately 3.75 inches in length, the second segment 37 is preferably approximately 2 inches in length, the third segment 36 is preferably approximately 9.5 inches in length, the fourth segment 35 is preferably approximately 2.5 inches in length, the fifth segment 34 is preferably approximately 2 inches in length, the sixth segment 33 is preferably approximately 3.5 inches in length and the seventh segment 32 is preferably approximately 1.25 inches in length. It can be appreciated that the lengths for the segments of the fertilizer tube 30 may vary to accommodate different types of planters.

C. Guard Scraper.

The guard scraper 20 is attached to a lower portion of the fertilizer tube 30 as illustrated in FIGS. 1 through 4 of the drawings. The guard scraper 20 is adapted to be removably attached to a mounting member 16 of a planter shank 14 of a seed planter implement used in the agricultural industry. The guard scraper 20 is used to protect the seed tube 13 during operation of the seed planter implement. The planter shank 14 includes a mounting aperture 15 that the disks 18 are attached to with a fastener extending through the mounting aperture 15 connecting disks 18 on opposing sides of the planter shank 14 as illustrated in FIGS. 9 through 12 of the drawings.

The guard scraper 20 may be comprised of any scraper that is removably attachable to a planter shank 14 of a planter implement such as, but not limited to, the John Deere guard scraper (Part Number A97107) designed for the John Deere MaxEmerge 5 Row Unit manufactured by Deere & Company. FIGS. 1 through 12, 14 and 15 illustrate an exemplary guard scraper 20 that is based on the design of the JOHN DEERE guard scraper (Part Number A97107) that fits onto the mounting member 16 of the planter shank 14 extending from the planter frame 12 of the planter implement.

The fertilizer tube 30 is attached to a lower leading edge of the guard scraper 20 by welding or other attachment means (e.g. fasteners). The guard scraper 20 includes a front edge 22, a rear portion 24 and a mounting portion 26, wherein the fertilizer tube 30 is attached to the front edge 22 of the guard scraper 20. The rear portion 24 of the guard scraper 20 is comprised of a flanged structure extending outwardly on opposing sides of a body portion of the guard scraper 20 as best illustrated in FIGS. 1, 2, 5 and 6 of the drawings. The rear portion 24 of the guard scraper 20 is broader in width than the main body portion of the guard scraper 20 and the fertilizer tube 30.

Figure 9:
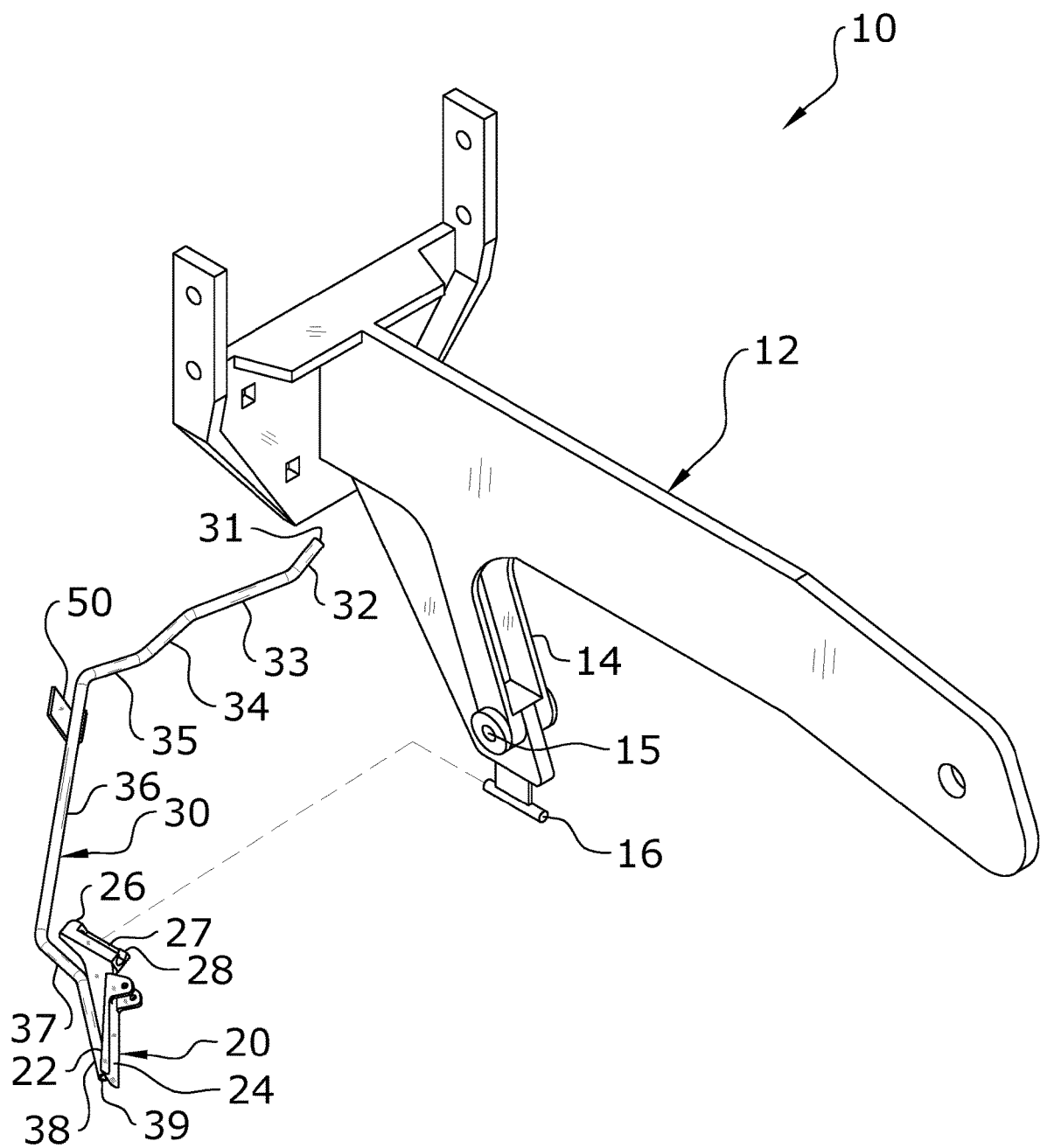
FIG. 9 is an exploded rear left side perspective view of the present invention with respect to a planter frame to be installed upon.

The mounting portion 26 of the guard scraper 20 removably attaches to the mounting member 16. The mounting member 16 of the planter shank 14 is comprised of an inverted T-shaped structure with the lower portion having a cylindrical shape that is received within the receiver channel 27 of the guard scraper 20 as illustrated in FIG. 9 of the drawings. The receiver channel 27 has an upper slot having a width that is smaller than the diameter of the lower portion of the mounting member 16. The receiver channel 27 further includes a rear opening that receives the front end of the lower portion of the mounting member 16. The front end of the receiver channel 27 is enclosed to prevent the guard scraper 20 from being removed rearwardly from the mounting member 16. The guard scraper 20 further includes a catch member 28 attached to a rear portion of the guard scraper 20 that is positioned adjacent to the rear edge of the vertical portion of the mounting member 16 when the guard scraper 20 is attached to the mounting member 16 thereby preventing forward movement of the guard scraper 20 upon the mounting member 16 when installed as illustrated in FIGS. 11 and 12 of the drawings.

D. Tab.

The tab 50 is attached to a central portion of the fertilizer tube 30 between the input opening 31 and the output opening 39. The tab 50 is comprised of a bendable material such as a bendable metal material to allow an installer the ability to bend the tab 50 adjacent to the side of the planter shank 14 as illustrated in FIG. 11 of the drawings. It is preferable that the tab 50 is attached to an upper portion of the second segment 36 as illustrated in FIGS. 1 through 4 of the drawings. It is further preferable that the tab 50 is welded to the fertilizer tube 30 and the tab 50 is attached to at least a quarter of the circumference of the fertilizer tube 30. The tab 50 is further preferably comprised of a flat structure but may have a non-flat structure.

Figure 11:
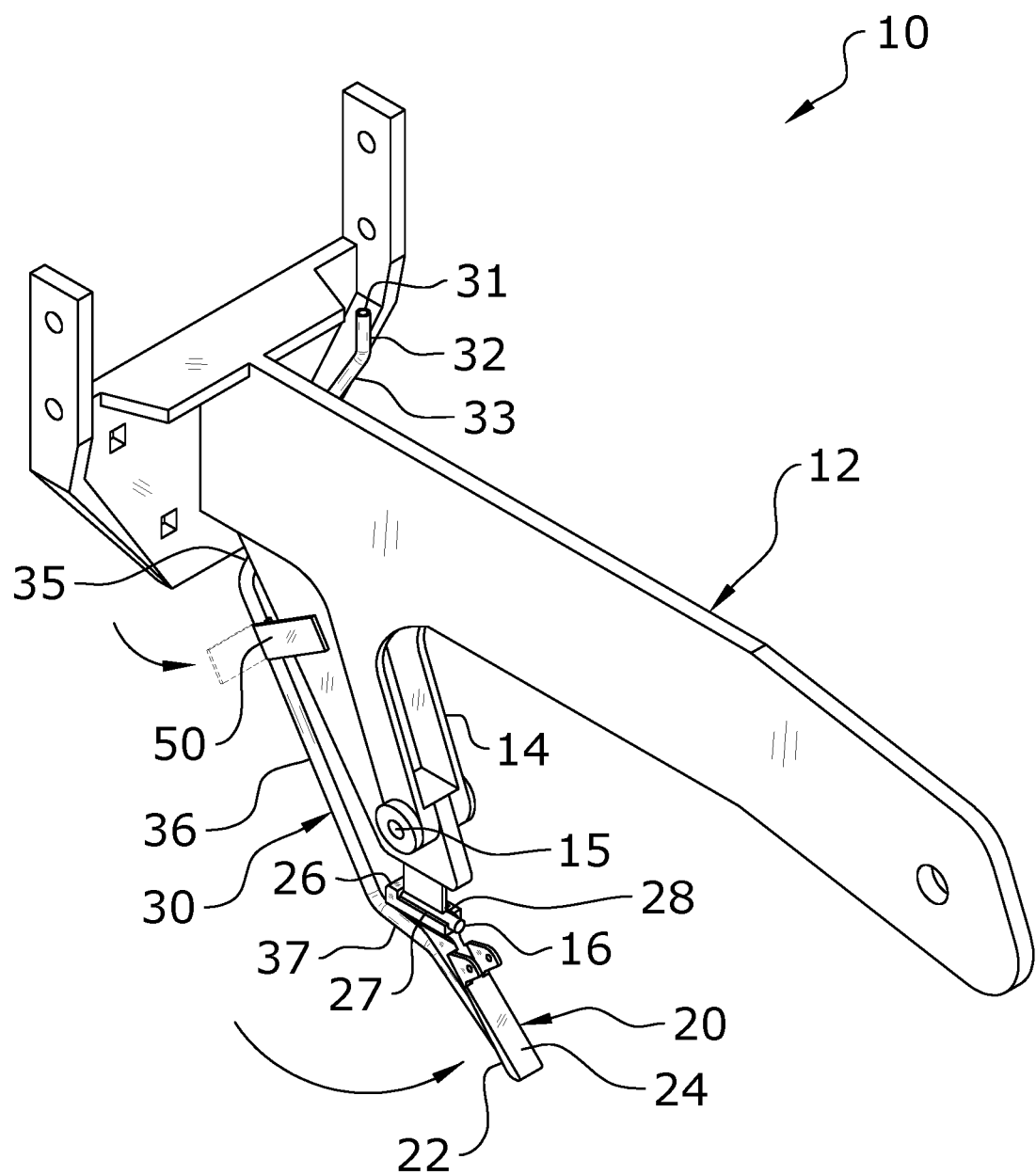
FIG. 11 is a rear left side perspective view of the present invention being rotated into the installed position and the tab bent over the planter shank to prevent removal of the invention from the planter shank.
Figure 12:
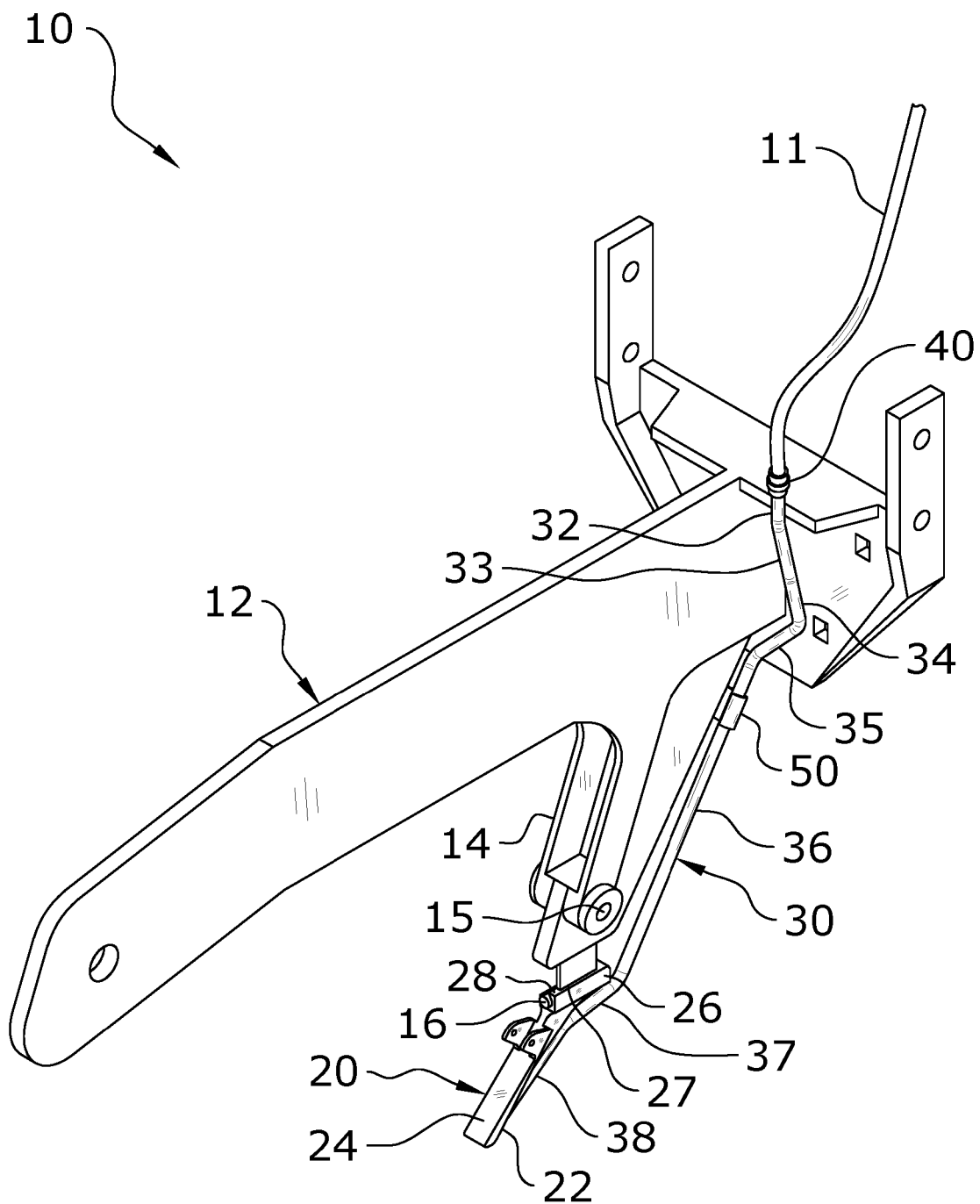
FIG. 12 is a rear right side perspective view of the present invention installed upon the planter shank and the fertilizer delivery tube attached to the fertilizer tube.

The tab 50 has an initial position as illustrated in FIGS. 1 through 9 of the drawings and a final position as illustrated in FIG. 11 of the drawings. The initial position of the tab 50 exists before the fertilizer tube 30 is attached to the planter shank 14 and the final position of the tab 50 exists after the fertilizer tube 30 is attached to the planter shank 14.

Figure 10:
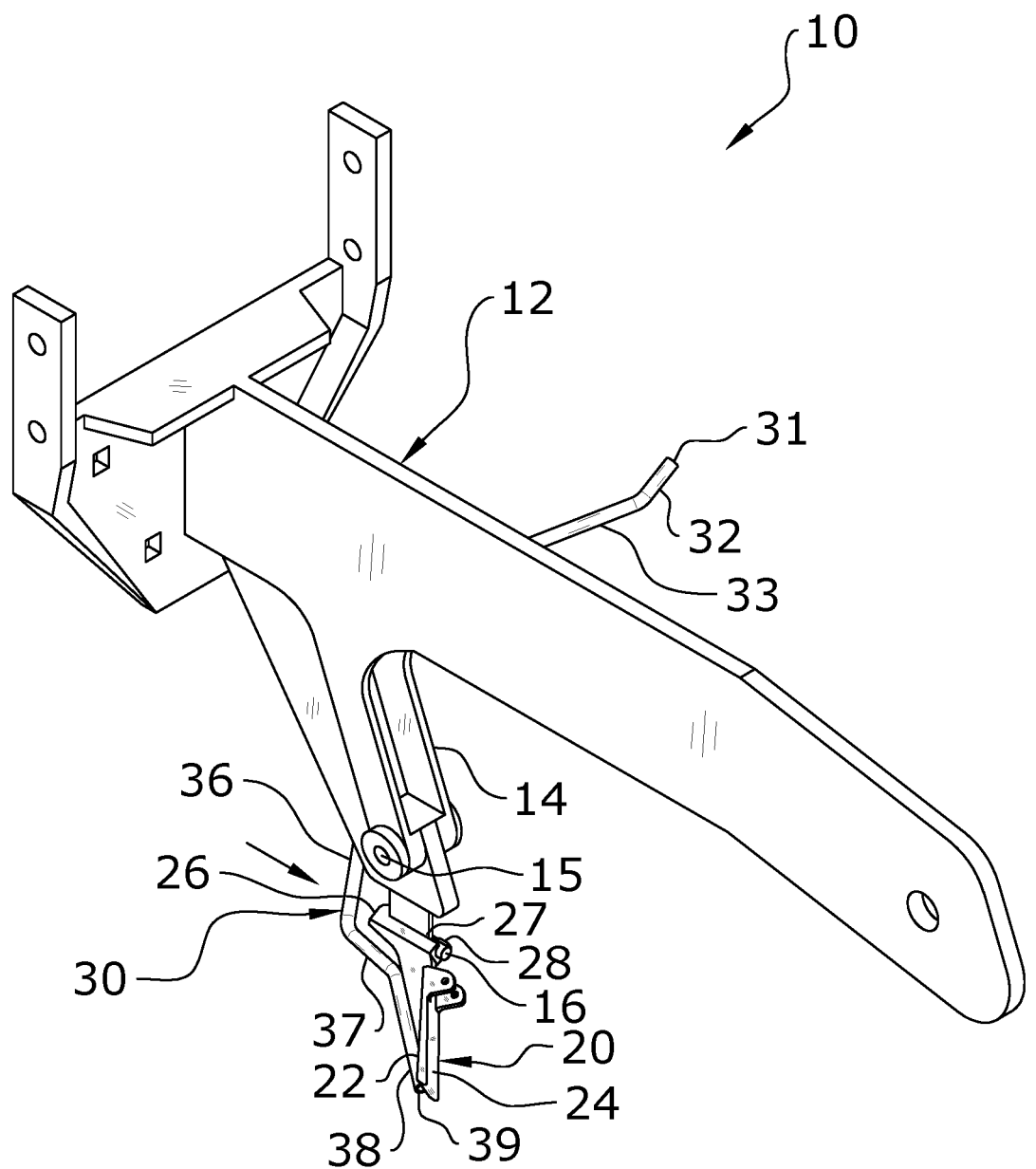
FIG. 10 is a rear left side perspective view of the present invention being slid upon the mounting member of the planter shank.

The tab 50 extends transversely with respect to a plane that is parallel to a main body of the guard scraper 20 extending from front to back of the guard scraper 20 when the tab 50 is in the initial position as best illustrated in FIGS. 1, 2, 5 and 6 of the drawings. The initial position of the tab 50 allows for the fertilizer tube 30 to be installed upon the planter shank 14 without interfering with the alignment of the fertilizer tube 30 in front of the planter shank 14 as shown in FIGS. 9 through 11 of the drawings. The tab 50 is preferably approximately ninety-degrees with respect to the plane when the tab 50 is in the initial position but may have different transverse angles.

The tab 50 is bent approximately ninety-degrees after the fertilizer tube 30 is in the desired position with respect to the planter shank 14 to be positioned adjacent to the side of the planter shank 14 as shown in FIG. 11 of the drawings. It is preferable that over fifty-percent of the total length and/or surface area of the tab 50 is substantially parallel to the plane when the tab 50 is in the final position. The tab 50 wraps around the leading edge of the planter shank 14 as further illustrated in FIG. 11.

E. Operation of Preferred Embodiment.

Figure 13:
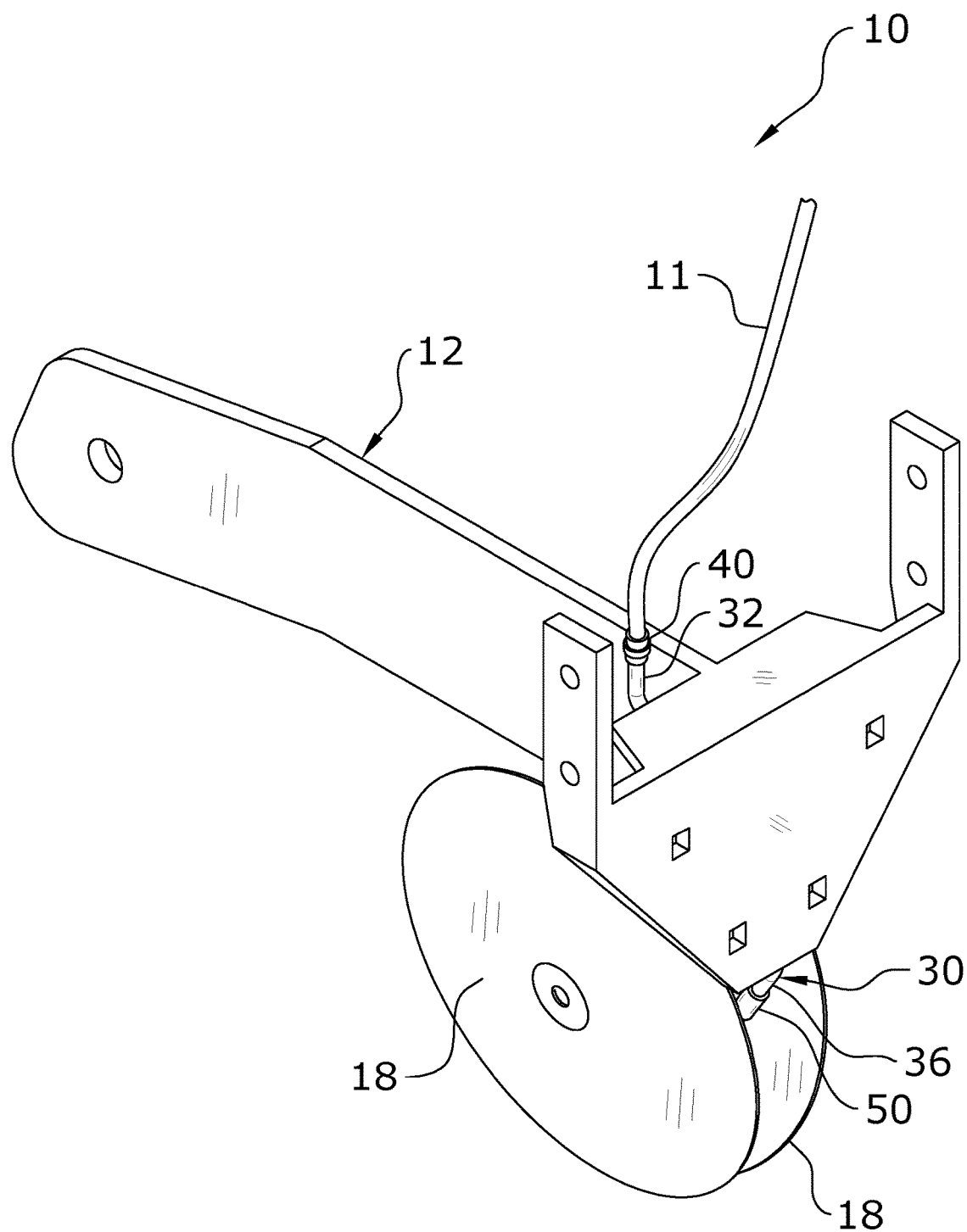
FIG. 13 is a front right side perspective view of the present invention attached to the planter shank with the disks attached.

In use, a fertilizer tube system 10 is attached to each planter shank 14 of a planter implement. To assemble the fertilizer tube system 10 to the planter implement, the user positions the mounting portion 26 of the guard scraper 20 so that the rear opening within the receiver channel 27 is aligned with the front end of the lower shaft of the mounting member 16. The guard scraper 20 is moved rearwardly so that the mounting portion 26 slides upon the lower shaft of the mounting member 16 until the front end of the lower shaft of the mounting member 16 engages the enclosed end of the receiver channel 27. The cross sectional shape and diameter of the receiver channel 27 is approximately the same as the lower shaft of the mounting member 16 to allow for a snug, yet slidable connection between thereof. The user then rotates the guard scraper 20 and the corresponding fertilizer tube 30 in a counterclockwise direction (as viewed from the rear) until the right edge of the receiver channel 27 engages the right side of the vertical portion of the mounting member 16 which also results in the catch member 28 being positioned adjacent to the rear edge of the vertical portion of the mounting member 16 to prevent forward movement thereof as illustrated in FIG. 11. After everything is properly aligned, the user bends the tab 50 about the planter shank 14 to prevent movement of the fertilizer tube 30 and to provide support to the upper portion of the fertilizer tube 30. When fully assembled and attached to the planter frame 12, the upper portion of the fertilizer tube 30 extends around a rearward extending upper portion of the planter frame 12 as best illustrated in FIGS. 12 and 13. The user then uses the coupler 40 to connect the fertilizer tube 30 to a fertilizer delivery tube 11 as shown in FIGS. 12 through 15 of the drawings. Each fertilizer delivery tube 11 comes from a fertilizer reservoir or manifold and supplies the fertilizer to each fertilizer tube system 10.

As the planter implement is pulled through the soil, the disks 18 create a V-shaped furrow in the soil which is well-known in the art of planters. The output opening 39 of the fertilizer tube 30 emits the liquid fertilizer onto the lower surface of the furrow in front of the seed tube 13 in preparation for the disbursement of the seed from the seed tube 13. The seed is then dispensed from the seed tube 13 and placed above the fertilizer within the furrow. The furrow is finally covered with soil to allow the seed to grow.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A fertilizer tube for attachment to a planter implement, comprising:
   the fertilizer tube having an input opening at an upper end of the fertilizer tube and an output opening at a lower end of the fertilizer tube, wherein the input opening is adapted for receiving fertilizer from a fertilizer system and wherein the output opening is adapted for dispensing the fertilizer into a seed furrow;
   wherein the fertilizer tube is comprised of a first segment, a second segment extending upwardly and forwardly from the first segment and a third segment extending upwardly from the second segment, wherein the first segment has a first angle with respect to a horizontal plane and wherein the second segment has a second angle with respect to the horizontal plane, and wherein the first angle is greater than the second angle; and
   a guard scraper having a front edge, wherein the first segment of the fertilizer tube is attached to the front edge of the guard scraper, wherein the guard scraper includes a mounting portion having a receiver channel adapted to be removably attachable to a mounting member of a planter shank of a planter implement, wherein the mounting member is comprised of an inverted T-shaped structure.

2. The fertilizer tube of claim 1, wherein the fertilizer tube is comprised of a continuous single structure.

3. The fertilizer tube of claim 1, including a tab attached to the fertilizer tube between the input opening and the output opening.

4. The fertilizer tube of claim 3, wherein the tab is attached to a central portion of the fertilizer tube.

5. The fertilizer tube of claim 3, wherein the tab has an initial position and a final position, wherein the initial position exists before the fertilizer tube is attached to the planter shank and wherein the final position exists after the fertilizer tube is attached to the planter shank.

6. The fertilizer tube of claim 5, wherein the tab extends transversely with respect to a plane that is parallel to a main body of the guard scraper extending from front to back of the guard scraper when the tab is in the initial position.

7. The fertilizer tube of claim 6, wherein the tab is approximately ninety-degrees with respect to the plane when the tab is in the initial position.

8. The fertilizer tube of system claim 6, wherein over fifty-percent of the tab is substantially parallel to the plane when the tab is in the final position.

9. The fertilizer tube of claim 1, wherein the output opening is within a lower distal end of the first segment, and wherein the first segment is comprised of a substantially straight structure that is substantially parallel to the front edge of the guard scraper.

10. The fertilizer tube of claim 1, wherein the first segment, the second segment and the third segment are all aligned along a common vertical plane.

11. The fertilizer tube of claim 1, wherein the third segment has a third angle with respect to the horizontal plane and wherein the third angle is greater than the first angle and the second angle.

12. The fertilizer tube of claim 1, wherein the third segment is substantially longer than either the first segment or the second segment.

13. The fertilizer tube of claim 12, wherein the third segment is longer than the first segment and the second segment added together.

14. The fertilizer tube of claim 12, wherein the second segment is shorter in length than the first segment.

15. The fertilizer tube of claim 1, wherein the third segment extends upwardly and forwardly from the second segment.

16. A method of attaching the fertilizer tube of claim 1, comprising:
   positioning the mounting portion of the guard scraper so that a rear opening within the receiver channel is aligned with a front end of a lower shaft of the mounting member;
   moving the guard scraper rearwardly so that the mounting portion slides upon the lower shaft of the mounting member until the front end of the lower shaft of the mounting member engages an enclosed end of the receiver channel;
   rotating the guard scraper and the corresponding fertilizer tube; and
   connecting the fertilizer tube to a fertilizer delivery tube from the fertilizer system.

17. A fertilizer tube for attachment to a planter implement, comprising:
   the fertilizer tube having an input opening at an upper end of the fertilizer tube and an output opening at a lower end of the fertilizer tube, wherein the fertilizer tube is comprised of a continuous single structure, wherein the input opening is adapted for receiving fertilizer from a fertilizer system and wherein the output opening is adapted for dispensing the fertilizer into a seed furrow;
   wherein the fertilizer tube is comprised of a first segment, a second segment extending upwardly and forwardly from the first segment and a third segment extending upwardly from the second segment, wherein the first segment has a first angle with respect to a horizontal plane and wherein the second segment has a second angle with respect to the horizontal plane, and wherein the first angle is greater than the second angle;
   wherein the output opening is within a lower distal end of the first segment, and wherein the first segment is comprised of a substantially straight structure that is substantially parallel to the front edge of a guard scraper; and
   the guard scraper having a front edge, wherein the first segment of the fertilizer tube is attached to the front edge of the guard scraper, wherein the guard scraper includes a mounting portion having a receiver channel adapted to be removably attachable to a mounting member of a planter shank of a planter implement, wherein the mounting member is comprised of an inverted T-shaped structure.

18. The fertilizer tube of claim 17, wherein the first segment, the second segment and the third segment are all aligned along a common vertical plane.

19. The fertilizer tube of claim 17, wherein the third segment has a third angle with respect to the horizontal plane and wherein the third angle is greater than the first angle and the second angle.

20. The fertilizer tube of claim 17, wherein the third segment extends upwardly and forwardly from the second segment.

21. A method of attaching the fertilizer tube of claim 17, comprising:
    positioning the mounting portion of the guard scraper so that a rear opening within the receiver channel is aligned with a front end of a lower shaft of the mounting member;
    moving the guard scraper rearwardly so that the mounting portion slides upon the lower shaft of the mounting member until the front end of the lower shaft of the mounting member engages an enclosed end of the receiver channel;
    rotating the guard scraper and the corresponding fertilizer tube; and
    connecting the fertilizer tube to a fertilizer delivery tube from the fertilizer system.

22. A fertilizer tube for attachment to a planter implement, comprising:
    the fertilizer tube having an input opening at an upper end of the fertilizer tube and an output opening at a lower end of the fertilizer tube, wherein the fertilizer tube is comprised of a continuous single structure, wherein the input opening is adapted for receiving fertilizer from a fertilizer system and wherein the output opening is adapted for dispensing the fertilizer into a seed furrow;
    wherein the fertilizer tube is comprised of a first segment, a second segment extending upwardly and forwardly from the first segment and a third segment extending upwardly from the second segment;
    wherein the first segment has a first angle with respect to a horizontal plane, wherein the second segment has a second angle with respect to the horizontal plane and wherein the third segment has a third angle with respect to the horizontal plane;
    wherein the first angle is greater than the second angle;
    wherein the third angle is greater than the first angle and the second angle
    wherein the first segment, the second segment and the third segment are all aligned along a common vertical plane;
    wherein the second segment is shorter in length than the first segment;
    wherein the third segment is longer than the first segment and the second segment added together;
    wherein the output opening is within a lower distal end of the first segment, and wherein the first segment is comprised of a substantially straight structure that is substantially parallel to the front edge of a guard scraper; and
    the guard scraper having a front edge, wherein the first segment of the fertilizer tube is attached to the front edge of the guard scraper, wherein the guard scraper includes a mounting portion having a receiver channel adapted to be removably attachable to a mounting member of a planter shank of a planter implement, wherein the mounting member is comprised of an inverted T-shaped structure.

23. The fertilizer tube of claim 22, wherein the third segment extends upwardly and forwardly from the second segment.

* * * * *